Figure 1:
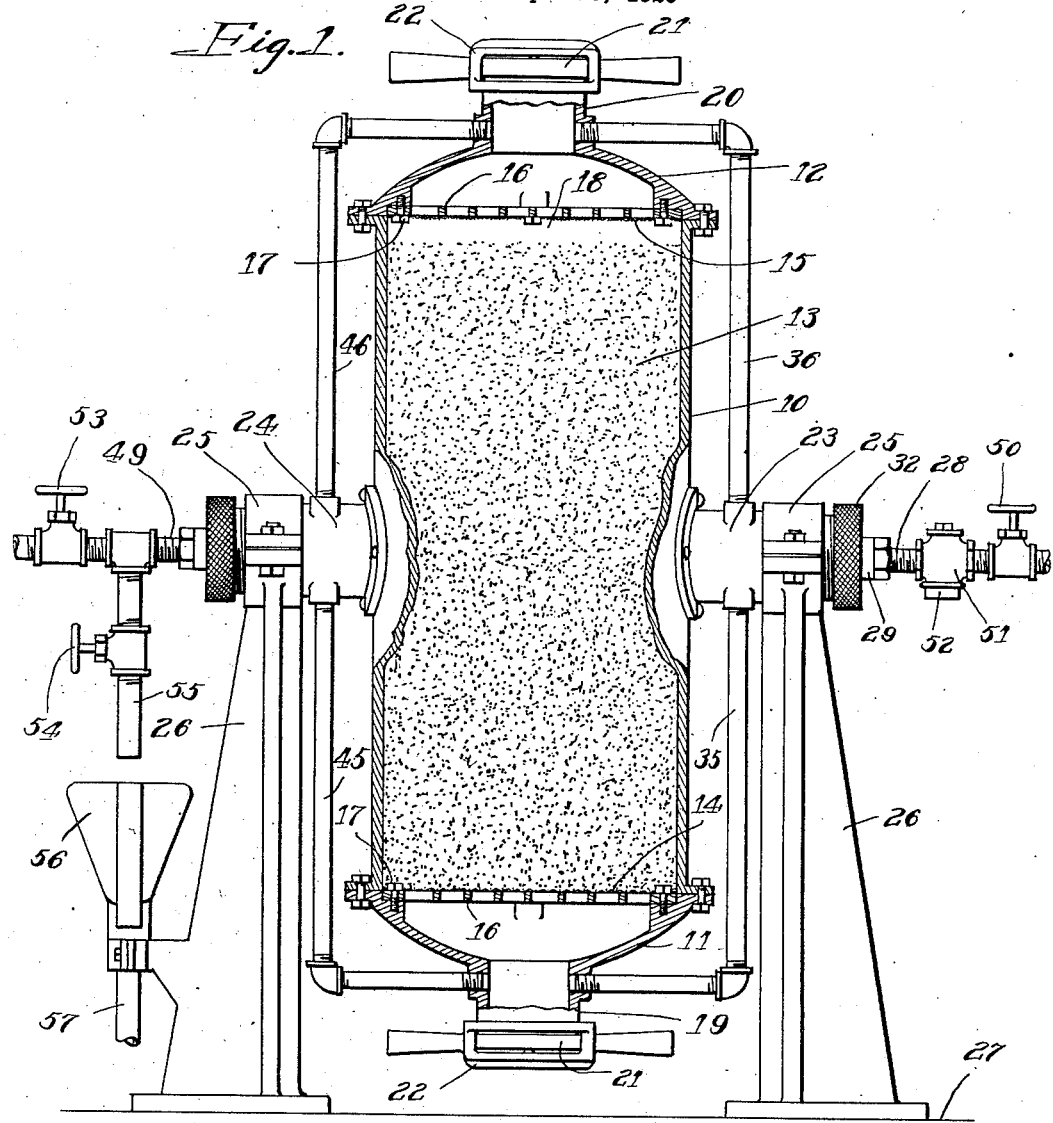

Jan. 15, 1929.

O. R. SWEENEY 1,698,743

SEMIAUTOMATIC WATER SOFTENER

Filed Sept. 16, 1925

Inventor:
Orland Russell Sweeney
By Wilson & McCanna
Attys

Patented Jan. 15, 1929.

1,698,743

UNITED STATES PATENT OFFICE.

ORLAND RUSSELL SWEENEY, OF AMES, IOWA, ASSIGNOR TO WARD-LOVE PUMP CORPORATION, OF ROCKFORD, ILLINOIS, A CORPORATION OF ILLINOIS.

SEMIAUTOMATIC WATER SOFTENER.

Application filed September 16, 1925. Serial No. 56,640.

This invention relates to water softeners operating on the base-exchange principle and relates more particularly to a water softener of this kind especially designed and intended for semi-automatic operation but capable of being operated mechanically or entirely automatically.

The principal objects of the invention are:

First, to provide a water softener having a reversible or invertible tank arranged to be inverted preferably at each regeneration of the base-exchange water softening material in the tank or oftener.

Second, to provide a softener operating preferably on the upward flow method both in the normal softening operation and during regeneration to take full advantage in both cases of the fact that the material is in a state of semi-suspension.

Third, to provide a softener wherein the regenerating brine is flowed through the softening material preferably in the same direction as the water during the normal softening operation but with the bed of material inverted for regeneration to take advantage of the counter-current principle of regeneration in which there is avoided the necessity for forcing the bulk of the hardness abstracted from the softening material in regeneration entirely through the bed of material.

Fourth, to provide a softener of the type referred to capable of parallel regeneration instead of counter-current regeneration, wherein the water during softening operation is flowed through the material from one end to the other end and the regenerating brine is likewise flowed through in the same direction.

Fifth, to provide a reversible softener having a bed of base-exchange water softening material such as zeolite between two diaphragms to be supported by whichever diaphragm is lowermost, and, in the case of upward flow operation, to have the lower diaphragm serve as a supporting medium and the upper diaphragm as a retaining medium for the material, thereby enabling the use of material of a finer texture than heretofore and deriving an appreciable saving in cost.

Sixth, to provide a softener of the reversible type described wherein the bed of softening material is periodically inverted so that the finer particles are removed from the top of the bed of material and are uniformly distributed with the coarser particles, thereby preventing cementing and consequent channeling while at the same time the bed is kept completely broken up for most efficient service.

Seventh, to provide a softener operating in the manner described giving the material an increased softening capacity over the material in previous types.

Eighth, to provide a softener wherein for continuous periods of time there is a reversal of the direction of flow of the fluid relative to the bed of softening material so that there is a tendency toward uniformity of chemical composition of the softening material and also the supporting and retaining diaphragms for the material are kept perfectly clear of any accumulations on either face thereof.

Ninth, to provide a softener wherein the operation of regeneration does not involve a complicated series of valve manipulations but wherein the softener is charged with regenerating material or brine and simply inverted and the material or brine is carried through the softening material by water flowing preferably in the same direction as during the normal softening operation, suitable means being provided to regulate or control the flow during softening so as not to exceed the capacity of the softening material to soften water and, during regeneration, so as not to exceed a rate of flow beyond the capacity of the softening material to undergo the desired chemical exchange with the regenerating material or brine, and Tenth, to provide a softener lending itself with equal facility for operation mechanically, automatically or semi-automatically although mechanical or semi-automatic operation is preferred for the reason that it is preferable for the user to be able to determine himself the time for regenerating the softener to suit his convenience and also for the reason that the time for regenerating a softener should be determined by noting the relative hardness of the water and not by taking an account simply of how much water has passed through the softener for softening, because the hardness of the water in any locality varies from time to time or, in fact, from day to day and it is therefore impossible to predict or predetermine with any accuracy how much water should be allowed to pass through the softener before regeneration should occur.

The foregoing and other objects of the invention will appear more clearly in the course of the following detailed description wherein reference is made to the accompanying drawing illustrating the invention.

Figure 2:
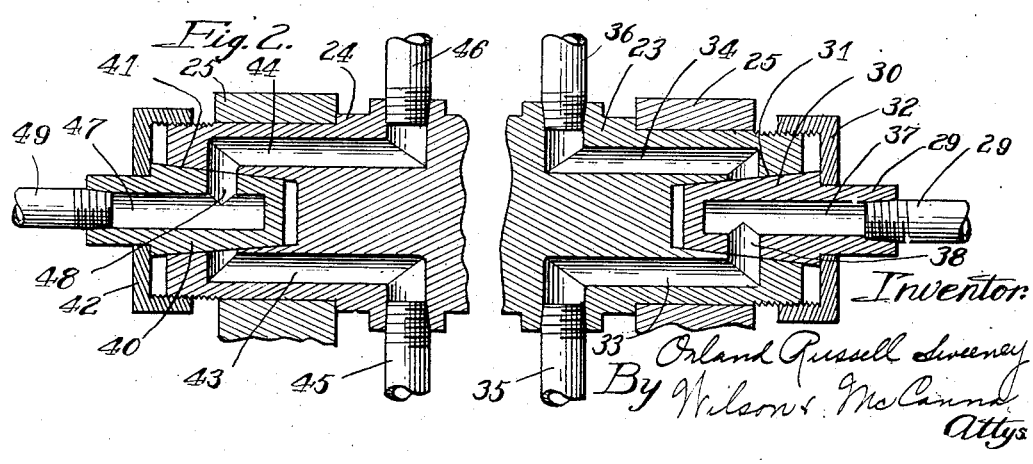

Referring to the drawing:

Fig. 1 is a front view partly in section and partly in elevation of a semi-automatic water softener made in accordance with my invention; and Fig. 2 is an enlarged fragmentary sectional detail of the valves controlling the direction of the flow of fluid through the softener in the trunnions therefor.

The water softener comprises a tank or other suitable container 10 having ends 11 and 12 bolting onto the opposite flanged ends thereof, as shown. A bed 13 of base-exchange water softening material commonly known as zeolite is held within the tank between diaphragms 14 and 15 at opposite ends of the tank. These diaphragms are preferably of filter cloth of a very fine mesh designed for filtering the incoming water and uniformly distributing the flow thereof throughout the cross-sectional area of the bed of softening material, as described in my Patent 1,557,117, issued October 13, 1925. In addition to the filtering and distributing functions, the filter cloths 14 and 15 constitute, respectively, the supporting and retaining mediums for the material. The diaphragms of filter cloth may be supported in the opposite ends of the tank in any convenient or preferred manner. For example, they may be mounted on grids or gratings 16 bolted to the ends 11 and 12, as indicated at 17. A slight head space may be left above the bed of material 13, as indicated at 18, to allow for a movement of the material in the flow of fluid through the softener. The softener is preferably operated on the upward flow method by virtue of which the material is kept in a state of semi-suspension. The space at 18 will allow for free movement of the particles in an obvious manner and prevent their packing against the upper diaphragm in the operation of the softener. If desired, however, the softener may be operated on the downward flow method as will be evident in the course of this specification.

The ends 11 and 12 have hollow necks 19 and 20, respectively, fitted with removable caps 21 held on by hand nuts 22 threading on the outside of the necks 19 and 20. The caps 21 are removed for the introduction of salt or other regenerating material or brine into the tank on top of the softening material, as will be described hereinafter. The tank 10 has trunnions 23 and 24 riveted or bolted thereon at diametrically opposite sides at the middle of the tank. These trunnions are received in bearings 25 on the legs which support the tank off the floor 27 to permit its being turned upside down in the regenerating operation as described hereinafter.

Hard water is conducted to the softener through an inlet pipe 28 which taps into a projecting neck 29 on a tapered plug 30 received in a tapering socket 31 in the adjacent end of the trunnion 23. The plug 30 is held in fluid-tight relation to the trunnion 23 in the socket 31 by a gland nut 32 passing over the reduced neck 29 and threading externally on the trunnion 23, as illustrated. The plug 30 remains stationary with the inlet pipe 28, and the trunnion 23 rotates with respect thereto in the revolving of the tank on its trunnions. It constitutes a valve controlling ducts 33 and 34 provided in the trunnion 23 leading respectively to the pipes 35 and 36 extending to the bottom neck 19 and top neck 20 of the tank 10, as shown. The plug 30 has a central bore 37 provided with a radial opening 38 forming a port to register alternatively with the ducts 33 or 34, it being arranged normally to supply water to the lower end of the tank 10 so as to flow upwardly through the softening material, as previously stated.

The other trunnion 24 is provided similarly with a tapered plug 40 received in the tapered socket 41 provided in the outer end thereof. The plug 40 is similarly held in fluid-tight relation to the trunnion 24 by a gland nut 42 and controls the flow of water from ducts 43 and 44, corresponding to the ducts 33 and 34 of the trunnion 23. The ducts 43 and 44 are provided at the terminal ends of pipes 45 and 46 extending respectively from the necks 19 and 20 at the lower and upper ends of the tank 10. The pipes 45 and 46, it will be seen, communicate with the bore 47 of the plug 40 through the radial opening 48 when the ends of the ducts 43 and 44 come alternatively into register with the opening 48 in the upright positions of the tank 10. The opening 48, it will be noted, permits the discharge from the tank 10 through the pipe 46 of softened water. The softened water is conducted through an outlet pipe 49 to the system served by the softener.

At this point it will be observed that the softener may be operated on the downward flow method by a simple reversal of position of both of the valves 30 and 40 in which case the hard water would be caused to enter the tank by way of the pipe 36 and would leave the tank by way of the pipe 45 in the position of the tank illustrated in Fig. 1. It is obvious that in both the upward and downward flow methods the water enters the tank at one end through a pipe at one side and leaves through a pipe at the diagonally opposite side at the opposite end of the tank.

The flow of water through the inlet 28 may be shut off or controlled by a valve 50 which is arranged to be closed at any time that a cap 21 is removed for the injection of regenerating material or brine into the tank. A regulating valve 51 is incorporated in the inlet connection to limit the flow of water through the tank in the normal softening operation to an amount not to exceed a predetermined limit so that the water will not flow through the tank at a rate beyond the capacity for the softening material therein to soften the water. In other words, the rate of flow is fixed regardless of the prevailing available water pressure in any locality and regardless of what number of taps may be opened in the service system to draw water. This valve is provided with a cap 52 threading on the body thereof to prevent unauthorized tampering with the setting thereof after the installation of the softener. The flow of water from the outlet pipe 49 to the service system is arranged to be controlled by a valve 53 which may be closed at the time regeneration of the softener is to be conducted. A valve 54 controls a by-pass 55 discharging into a timing funnel 56 mounted suitably on one of the supporting legs 26 of the softener. The funnel 56 discharges through a pipe 57 to any convenient drain. During regeneration the valve 50 is left fully opened and the valve 53 is closed. The valve 54 is opened only to such an extent that a certain level is maintained in the funnel 56 whereby to control the rate at which the regenerating material is carried through the softening material, there being a definite time factor involved for the chemical exchange to occur between the softening material and the regenerating brine. The means for regulating and controlling the flow of water and the passage of regenerating brine through the softener is more fully described and claimed in a copending application of Oscar W. Johnson, Serial No. 46,198, filed July 27, 1925, and no invention is claimed therein in this application except as to the novel arrangement thereof in connection with my improved water softener.

The operation of the water softener is as follows:—As previously described, the normal flow of water in the softening operation is upward through the softening material. Hard water enters through the inlet pipe 28 and is conducted through the duct 33 and pipe 35 to the bottom end of the tank 10. In flowing upwardly through the tank, the water is first thoroughly filtered and uniformly distributed throughout the cross-sectional area of the bed of material by the filter cloth diaphragm 14. The material is held in a state of semi-suspension in the rising column of water. The best possible intimate contact between the water and the softening material is thereby secured. The filter cloth diaphragm 15 serves to retain any particles entrained with the water leaving the tank. The provision of this cloth in the fixed type of softener is often dispensed with by the provision of a certain amount of head space or dampening space. However, the provision of this retaining medium is one factor which enables the use of softening material of a finer texture and there is a consequent appreciable saving in cost. Furthermore, finer material gives more efficient softening operation and the capacity of the softener as a whole is greatly increased. The softened water discharges through the pipe 46 and is conducted to the service system through the outlet pipe 49. After a certain length of time, the softening material becomes exhausted and will no longer properly soften the water. In the present case, the user will then close the valves 50 and 53 and remove the cap 21 from the neck 20 at the upper end of the tank to introduce salt or other regenerating material or brine into the tank. The cap 21 is then replaced and the tank is revolved on its trunnions to an upside down position with the bed of softening material 13 inverted and the regenerating material beneath the same. The valve 50 is then fully opened and the valve 54 opened gradually to secure a predetermined desired rate of passage of the regenerating brine through the tank, as previously referred to. During the softening operation, the bed of softening material has become exhausted practically completely at its lower end where the incoming hard water has come in direct contact therewith and, as the top thereof is approached, the material is less and less exhausted. Thus, when the regenerating material or brine is introduced at the top end of the bed and the bed is inverted and the regenerating brine is passed upwardly through the softening material, the bulk of the hardness assimilated by the material will then be transposed to the top of the bed of material in the tank and will be readily carried out without having to be forced through the entire bed of softening material. This is in accordance with the counter-current principle of regeneration. Furthermore, due to the fact that the regenerating flow is upward through the material, the material is in a state of semi-suspension just as it is during softening operation and the best possible contact between the regenerating brine and the softening material is secured for the most efficient chemical exchange. Where the normal flow was upward through the bed of softening material but regeneration was conducted on the downward flow, such intimate contact could not be secured and there was some tendency toward packing and cementing of the softening material. The periodic reversing of the flow of fluid through the system for continuous periods of time keeps the filter cloth diaphragms 14 and 15 absolutely clear of any accumulations on either face thereof. Obviously, any accumulations of sediment or sludge from the incoming hard water on the entering face of the diaphragm 14 is cleared off and carried out with the water discharged during regeneration when the tank is invented, as has just been described. The regenerating operation is conducted usually for about twenty-five or thirty minutes or at least until the water passed through the bed proves to be soft. Then the only operations necessary are to close the valve 54 and open the valve 53 and the system is again in normal operation. Obviously, there are but few valve manipulations required at any time and nothing complicated is involved in the operation of the softener as it has been rendered practically fool proof by virtue of the improvements described. The inversion of the tank automatically reverses the flow of fluid relative to the softening material and it will be appreciated that this periodic reversing of flow will tend toward practically uniform chemical composition of the material. Furthermore, the inversion of the tank removes the finer particles of material from the top and is conducive toward a more uniform distribution of the fine and coarse particles and has been found to give most efficient service and especially tends to avoid channeling. It is obvious that the periodic inversion of the bed of material practically prohibits the cementing thereof and keeps the bed thoroughly broken up which, however, is also induced by the upward flow operation.

It will be apparent from the foregoing that any suitable means for reversing or inverting the softener may be provided of a mechanical or entirely automatic type instead of the semi-automatic type herein described. For example, the softener may be inverted by mechanical means under the control of the user to be set into operation when the user finds that regneration is necessary on noting the relative hardness of the water; or the softener may be regenerated entirely automatically by means controlled by a meter metering the water softener by the plant, or a time controlled mechanism of any suitable type may be provided for the purpose. No means have been illustrated for holding the softener in the operative position shown, inasmuch as its center of gravity will be below the axis of the trunnions by virtue of the bed of softening material and there will be a certain amount of friction in the bearings supporting the softener that may be relied upon to hold the same in its adjusted position. If desired, any suitable form of a limiting stop and fastening means to determine the proper upright position of the tank and to hold the same in such position may be provided. The embodiment herein disclosed is merely for the purposes of illustration and it will be understood that the invention is in no wise limited to the particular details illustrated, inasmuch as they may be departed from to considerably extents without sacrificing any of the more important advantages of the invention.

I claim:

1. The method of operating a base-exchange water softener which consists, first, in passing hard water through a zeolite material bed in a certain direction for softening; second, reversing the position of the bed end for end, and third, passing brine or other reagent through the bed in the same direction as in softening.

2. The method of operating a base-exchange water softener which consists, first, in passing hard water through a zeolite material bed in a certain direction for softening; second, reversing the position of the bed end for end; third, passing brine or other reagent through the bed in the same direction as in softening, and thereafter resuming the flow of hard water in the same direction through the bed for softening operation.

3. The method of operating a base-exchange water softener which consists, first, in passing hard water upwardly through a bed of zeolite material for softening; second, turning the bed upside down so as to bring the most exhausted material to the top of the bed, and third, passing brine or other reagent upwardly through the bed of material for regenerating the same.

4. The method of operating a base-exchange water softener which consists, first, in passing hard water upwardly through a bed of zeolite material for softening; second, turning the bed upside down so as to bring the most exhausted material to the top of the bed; third, passing brine or other reagent upwardly through the bed of material for regenerating the same, and thereafter resuming the upward flow of hard water through the bed for softening.

5. A water softener comprising a tank containing a bed of water softening material, said tank having water-permeable means at both ends for supporting the bed and being reversible end for end so as to invert the bed, a salt cap for each end of said tank arranged to permit the introduction of salt or brine at the end of a softening run into whichever end of the tank is uppermost, and means communicating with the upper and lower ends of said tank for admitting hard water thereto for passage through the bed always in one direction for softening or regeneration regardless of which end of the tank is uppermost and for withdrawing soft water or waste water from the tank in softening and regeneration.

6. A water softener comprising a tank containing a bed of water softening material, said tank having water-permeable means at both ends for supporting the bed and being reversible end for end so as to invert the bed, a salt cap for each end of said tank arranged to permit the introduction of salt or brine at the end of a softening run into whichever end of the tank is uppermost, means for supplying hard water to whichever end of the tank is lowermost in softening and regeneration, and means for withdrawing soft water or waste water from whichever end is uppermost in softening and regeneration.

In witness of the foregoing I affix my signature.

ORLAND RUSSELL SWEENEY.